United States Patent [19]

McNamee

[11] Patent Number: 4,759,581
[45] Date of Patent: Jul. 26, 1988

[54] PRIVACY AND SUNSHADE FOR RECREATIONAL VEHICLE

[76] Inventor: Thomas C. McNamee, 2451 Monaco Dr., Oxnard, Calif. 93035

[21] Appl. No.: 75,122

[22] Filed: Jul. 17, 1987

[51] Int. Cl.⁴ .................................................. B60J 3/00
[52] U.S. Cl. ............................... 296/95 C; 296/97 C; 296/97 D; 160/370.2
[58] Field of Search ............... 296/95 R, 95 C, 97 R, 296/97 D, 138; 160/368 R, 368 S

[56] References Cited

U.S. PATENT DOCUMENTS

| | | | |
|---|---|---|---|
| 2,821,248 | 1/1958 | Irvine | 160/368 S |
| 3,751,100 | 8/1973 | Keyes | 296/95 C |
| 4,560,245 | 12/1985 | Sarver | 296/95 C |
| 4,671,558 | 6/1987 | Cline | 296/97 R |

*Primary Examiner*—Robert R. Song
*Attorney, Agent, or Firm*—Donald A. Streck

[57] ABSTRACT

A combined privacy and sunshade for the windshield and dashboard protection for a vehicle. There is an upper sheet of a flexible material sized and shaped to fit over a horizontal portion of the windshield and having a central portion capable of passing at least but only a portion of light incident thereon therethrough. There is also a lower sheet of opaque flexible material permanently or removably hingedly attached to a bottom edge of the upper sheet and a mirror image of the upper sheet. When the upper sheet is positioned over a portion of the windshield, the lower sheet is hingedly movable between a privacy position covering the upper sheet and a dashboard protecting position covering a portion of the dashboard. Touch fastener material is employed for releasably attaching the upper sheet to the windshield and for releasably attaching the lower sheet to the upper sheet when the lower sheet is raised to the privacy position.

9 Claims, 1 Drawing Sheet

PRIVACY AND SUNSHADE FOR RECREATIONAL VEHICLE

BACKGROUND OF THE INVENTION

The present invention relates to sun protection and privacy shades and, more particularly, to a combined privacy and sunshade for the windshield and dashboard protection for a vehicle comprising, an upper sheet of a flexible material sized and shaped to fit over a horizontal portion of the windshield and having a central portion capable of passing at least but only a portion of light incident thereon therethrough; a lower sheet of opaque flexible material hingedly attached to a bottom edge of the upper sheet and a mirror image of the upper sheet, the lower sheet when the upper sheet is positioned over a portion of the windshield being hingedly movable between a privacy position covering the upper sheet and a dashboard protecting position covering a portion of the dashboard; means for releasably attaching the upper sheet to the windshield; and, means for releasably attaching the lower sheet to the upper sheet when the lower sheet is raised to the privacy position.

Sunshading and privacy shading are a constant problem, particularly in recreational vehicles when parked. A similar problem, of course, exists in boats, trucks, and vans. This is particularly true in the windshield and dashboard areas. Side and rear windows away from the driver's area are generally vertical and can be covered with various conventional window coverings from drapes to miniblinds. The windshield, however, generally tilts backwards towards the driver and curves from side to side. Moreover, the dashboard is usually a compound curved structure directly below and in front of the windshield tending to interfere with the placement of anything over the windshield. As a result, a removable opaque covering is generally placed over the outside of the windshield when the vehicle is parked if privacy and sunscreening of the driver's compartment is desired. That certainly works, but is an all or nothing arrangement. If the occupants want to see out through the windshield, privacy is forsaken and a beach towel is thrown over the dashboard to protect it from the damaging sun's rays. To restore privacy, the large windshield cover must be removed from storage and the occupant must go back outside to attach it over the windshield.

Wherefore, it is the object of the present invention to provide a combined privacy and sunshade for the windshield of a recreational vehicle, boat, truck, van, or the like, which can be removably attached to the inside of the windshield and which provides complete privacy in one position and sunshading and dashboard protection in another position.

It is another object of the present invention to provide a combined privacy and sunshade for a windshield and adjacent dashboard which is installable and changable as to function totally from inside the vehicle.

Other objects and benefits of the present invention will become apparent from the detailed description which follows hereinafter taken in conjunction with the drawing figures which accompany it.

SUMMARY

The foregoing objects have been achieved by the combined privacy and sunshade for the windshield and dashboard protection for a vehicle of the present invention comprising, an upper sheet of a flexible material sized and shaped to fit over a horizontal portion of the windshield and having a central portion capable of passing at least but only a portion of light incident thereon therethrough; a lower sheet of opaque flexible material hingedly attached to a bottom edge of the upper sheet and a mirror image of the upper sheet, the lower sheet when the upper sheet is positioned over a portion of the windshield being hingedly movable between a privacy position covering the upper sheet and a dashboard protecting position covering a portion of the dashboard; means for releasably attaching the upper sheet to the windshield; and, means for releasably attaching the lower sheet to the upper sheet when the lower sheet is raised to the privacy position.

In the preferred embodiment, the hinged attachment is permanent while in an alternate embodiment the hinged attachment is through the use of touch fastener material so that the lower sheet can be removed and stored separately if desired.

DESCRIPTION OF THE PREFERRED EMBODIMENT

Figure 1:
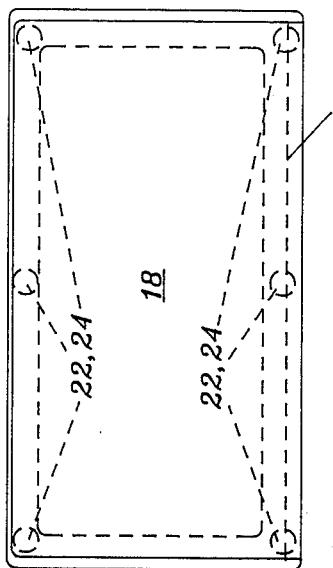
FIG. 1 is a front view of the present invention in its sunshading and dashboard protecting position.
Figure 3:
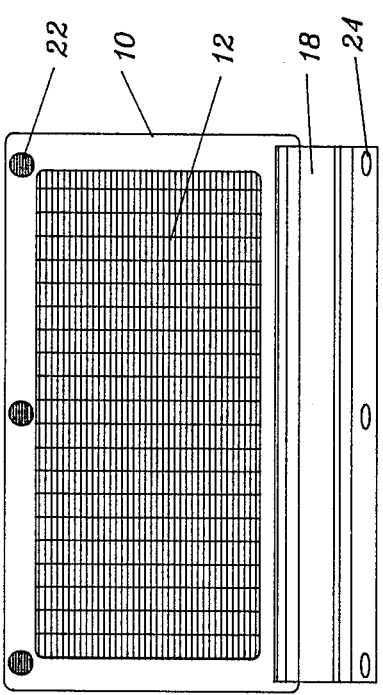
FIG. 3 is a side view of FIG. 1 with the present invention attached to a windshield and protecting a dashboard.

The present invention as described hereinafter can be constructed to cover an entire windshield or portions thereof, as desired. As shown in the figures, there is a frame-like binding 10 of a flexible material such as cloth backed vinyl comprising a top, a bottom and a pair of sides as best seen in FIG. 1 surrounding a sunshading and partial privacy material 12 capable of passing only a portion of light 14 incident thereon therethrough as best seen in FIG. 3 wherein the present invention is shown attached to a vehicle windshield 16 in a manner to be described in greater detail shortly. The material 12 surrounded by the binding 10 is shaped to fit over the windshield or portion thereof. Generally, it will be substantially rectangular in shape. While various materials could be employed as the sunshading and partial privacy material 12, applicant prefers the material described in his co-pending patent application Ser. No. 045,529, filed May 4, 1987 and entitled RV PRIVACY AND SUNSCREEN. While the binding 10 is shown as a wide material in the figures, it could also be in the form of a narrow tape simply folded over the edges of the sunshading and partial privacy material 12 and sewn thereto so as to provide a neat edge.

Figure 2:
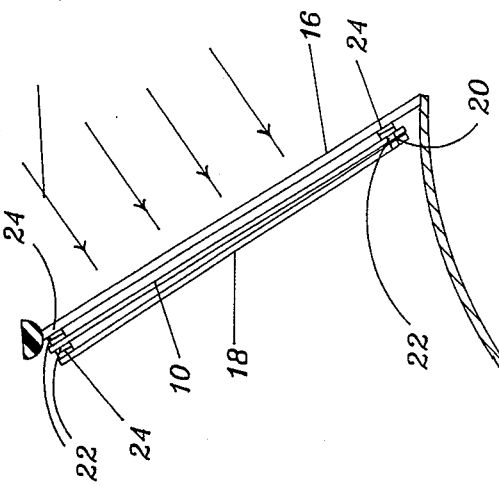
FIG. 2 is a front view of the present invention in its complete privacy position.
Figure 4:
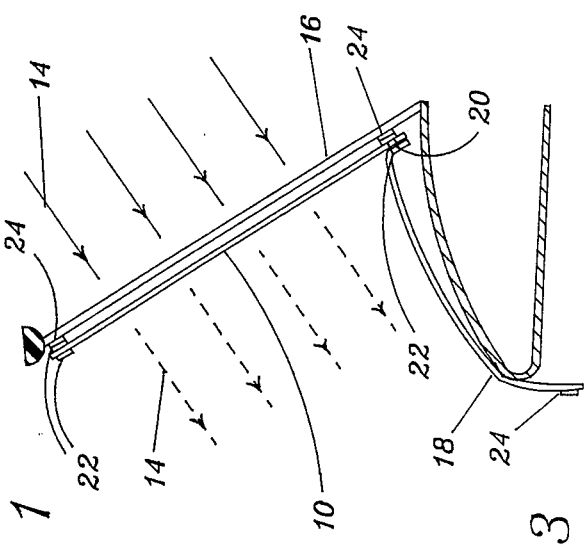
FIG. 4 is a side view of FIG. 2 with the present invention attached to a windshield.

A sheet of a flexible, opaque material 18, such as the cloth backed vinyl preferred for the frame 10, is preferably hingedly attached to the frame 10 along the bottom edge as by sewing, as indicated by the dashed line 20. The opaque material 18 could, of course, be unattached permanently, if desired, to be removed and replaced separately. The opaque material 18 is shaped as a mirror image of the frame 10. As thus constructed, the sheet of opaque material 18 can be lowered to a sunscreening and dashboard protecting position as shown in FIGS. 1 and 3 or raised to a complete privacy position as shown in FIGS. 2 and 4. As desired, since the present invention is attached to the inside of the windshield 16 as will be described shortly, the opaque material 18 can be raised and lowered between the above-described positions from within the vehicle. As can be seen in FIG. 3, when in the lowered position, the opaque material 18 drapes over and covers the dashboard portion in front of it from any light 14 whatsoever. At the same time, light 14 incident upon the sunshading and partial privacy material 12 is only partially passed through, thus providing sunscreening with respect to the sun's rays as well as partial privacy to the occupants. When in the raised position of FIGS. 2 and 4, of course, the light 14 is completely blocked by the opaque material 18 thus blocking out all the sun's rays and affording complete privacy to the occupants.

The preferred method of attachment of the sunshading and partial privacy material 12 to the windshield 16 and of attachment of the opaque material 18 to the sunshading and partial privacy material 12 in the raised position is the use of so-called touch fastener material such as that sold under the trademark Velcro ®. The term "touch fastener" is a generic term applied by manufacturers to a variety of products comprising a first planar backing material having a surface carrying hooks, mushrooms, balls on stems, pigtails, or the like, capable of engaging loops, hooks, mushrooms, balls on stems, pigtails, or the like, carried by a second planar backing material to releasably fasten components together. Thus, well known two part fastening systems such as Velcro ® hook and loop and snaps are intended by applicant to be included within the generic designation touch fastener material as employed herein and in the claims appended hereto. First portions 22 of the touch fastener material are attached to the top of the binding 10 on both sides thereof at the corners and as necessary between the corners depending on the width being covered and attendant tendency of the sunshading and partial privacy material 12 to droop at the top. Second portions 24 of the touch fastener material (i.e. the releasably mating portions) are attached to the opaque material 18 on the side facing the sunshading and partial privacy material 12 and to the windshield 16 so as to mate with the first portions 22 when the opaque material 18 is raised to the position of FIGS. 2 and 4 and when the sunshading and partial privacy material 12 is positioned over the windshield 16 in its desired position. The first portions 22 and second portions 24 are most easily attached to the binding 10 and opaque material 18 by sewing while attachment of the second portions 24 to the windshield is best accomplished through the use of peel and stick adhesive tape, or the like, as well known in the art. If a narrow edge-only tape is employed as the binding 10, the first and second portions 22, 24 could, of course, be sewn or otherwise attached directly to the sunshading and partial privacy material 12. If desired, touch fastener material could also be employed to removably yet optionally hingedly attach the sheet of flexible, opaque material 18 to the binding 10 or sunshading and partial privacy material 12 along the bottom edge positioned along the dashed line 20 of FIG. 2 instead of by sewing.

Thus, it can be seen from the foregoing description that the present invention has met its stated objective by providing a combined sunshade and privacy screen that can be attached, removed, and adjusted from within a recreational vehicle, boat, truck, or van for providing sunscreening for the occupants and the vehicle's dashboard as well as complete privacy for the occupants when desired.

Wherefore, having thus described my invention, I claim:

1. An interior privacy and sunshade for a window of a vehicle comprising:
    (a) a binding of a flexible material shaped to fit over the window, said binding having a top portion, a bottom portion, and a pair of side portions connected at corners thereof;
    (b) a sheet of flexible sunshading material capable of passing only a portion of light incident thereon therethrough disposed within said binding and attached thereto;
    (c) a first plurality of one portion of touch fastener material disposed adjacent said corners of said binding on one side of said flexible sunshading material, said first plurality being releasably matable with a first plurality of matching other portions of said touch fastener material disposed about the periphery of the window;
    (d) a sheet of flexible, opaque material the size and shape of said sheet of flexible sunshading material hingedly attached to said sheet of flexible sunshading material adjacent said bottom portion of said binding on the side opposite said one side;
    (e) a second plurality of one portion of touch fastener material disposed adjacent said corners of said binding on the side opposite said one side; and,
    (f) a second plurality of matching other portions of said touch fastener material disposed on said sheet of flexible opaque material on the side thereof facing said sheet of flexible sunshading material and positioned to mate with said second plurality of first portions when said sheet of flexible opaque material is disposed over said sheet of flexible sunshading material.

2. The interior privacy and sunshade for a window of a vehicle of claim 1 wherein:
    said sheet of opaque material is hingedly attached to said sheet of flexible sunshading material with touch fastener material whereby said sheet of opaque material can be removed from said sheet of flexible sunshading material and stored separately if desired.

3. An interior privacy and sunshade for the windshield and dashboard of a vehicle comprising:
    (a) a generally rectangular sheet of flexible material comprising upper and lower halves hingedly joined horizontally at the middle, said upper half being sized and shaped to fit over a horizontal portion of the windshield, said lower half being lowerable to a position disposed over and protecting a horizontal portion of the dashboard and raisable to a position covering said upper half, said upper half having a central sunshading portion capable of passing at least but only a portion of light incident thereon therethrough, said lower half being opaque and a mirror image shape of said upper half;
    (b) means for releasably attaching said upper half to the windshield; and,
    (c) means for releasably attaching said lower half to said upper half when said lower half is raised to said position covering said upper half.

4. The interior privacy and sunshade for the windshield and dashboard of a vehicle of claim 3 wherein:
    said means for releasably attaching said upper half to the windshield and said means for releasably attaching said lower half to said upper half each comprise mating portions of touch fastener material.

5. The interior privacy and sunshade for the windshield and dashboard of a vehicle of claim 3 wherein:
said upper and lower halves of said sheet of flexible material are releasably joined together whereby said lower half can be removed from said upper half and stored separately if desired.

6. The interior privacy and sunshade for the windshield and dashboard of a vehicle of claim 5 wherein:
said upper and lower halves of said sheet of flexible material are releasably joined together with mating portions of touch fastener material.

7. A combined privacy and sunshade for the windshield and dashboard protection for a vehicle comprising:
(a) an upper sheet of a flexible material sized and shaped to fit over a horizontal portion of the windshield and having a central portion capable of passing at least but only a portion of light incident thereon therethrough;
(b) a lower sheet of opaque flexible material hingedly attached to a bottom edge of said upper sheet and a mirror image of said upper sheet, said lower sheet when said upper sheet is positioned over a portion of the windshield being hingedly movable between a privacy position covering said upper sheet and a dashboard protecting position covering a portion of the dashboard;
(c) means for releasably attaching said upper sheet to the windshield; and,
(d) means for releasably attaching said lower sheet to said upper sheet when said lower sheet is raised to said privacy position.

8. The combined privacy and sunshade for the windshield and dashboard protection for a vehicle of claim 7 wherein:
said means for releasably attaching said upper sheet to the windshield and said means for releasably attaching said lower sheet to said upper sheet each comprise mating portions of touch fastener material.

9. The combined privacy and sunshade for the windshield and dashboard protection for a vehicle of claim 7 wherein:
said lower sheet is hingedly attached to said upper sheet with touch fastener material whereby said lower sheet can be removed from said upper sheet and stored separately if desired.

* * * * *